June 16, 1925.  1,542,368

A. E. BRYCE

POT HANDLE HOLDER

Filed Nov. 19, 1923

Inventor
Allan Edward Bryce
By
Attorney

Patented June 16, 1925.

1,542,368

UNITED STATES PATENT OFFICE.

ALLAN EDWARD BRYCE, OF PROVIDENCE, RHODE ISLAND.

POT-HANDLE HOLDER.

Application filed November 19, 1923. Serial No. 675,788.

*To all whom it may concern:*

Be it known that I, ALLAN E. BRYCE, a citizen of the United States, residing at Providence, in the county of Providence and State of Rhode Island, have invented certain new and useful Improvements in a Pot-Handle Holder, of which the following is a specification.

This invention relates to improvements in removable handles designed primarily for use on pots, pans, kettles, and the like and is particularly adapted for holding the bail or handle away from the heated body portion of the utensil so as to prevent the heating of the bail or handle due to radiation and other heating properties.

Another object of the invention is to provide a removable handle formed of spring metal designed to be attached to a portion of the heated vessel or utensil for holding the bail or handle in an upright position while the contents within the utensil is being cooked or heated.

Referring now to the drawing which forms a part of the specification,

Figure 1:
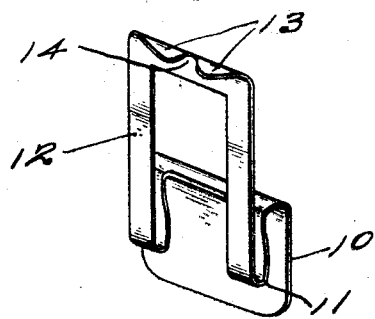
Figure 1 is a perspective view of my invention.
Figure 2:
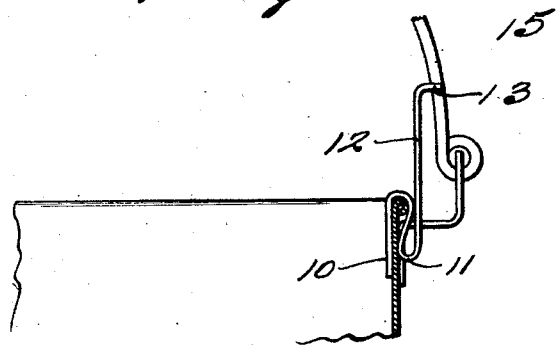
Figure 2 is a side elevation showing the same attached to a utensil.
Figure 3:
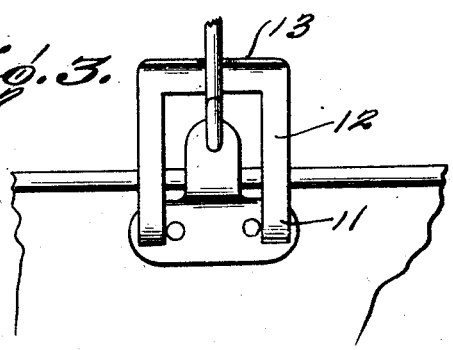
Figure 3 is a rear elevation showing the same attached to a utensil and the handle thereof.

Referring now to the drawing, wherein like characters of reference denote corresponding parts, the numeral 10 indicates the body of a clamping member formed ot spring metal which is bent downwardly at 11 and upwardly to provide a substantially U-shaped frame 12, and said frame at its uppermost portion is slightly bent to provide flanges 13 which have a groove 14 formed centrally thereof which is designed to receive a bail or handle of a utensil for holding the same in an upright position while the contents of the vessel is being cooked or heated, thereby permitting the user of this article to remove a heated vessel from the stove without any danger of burning the hands.

In operation, it is simply necessary that the housekeeper or user of this device place the body portion over the side wall of the utensil, so that the substantially U-shaped frame will extend upwardly to permit the bail or handle 15 to be received in the grooved portion of the frame for holding the same in an upright position during the heating or cooking process.

In view of the foregoing description of my invention, taken in connection with the accompanying drawing, it is thought that any further explanation as to the construction, operation, and objects of same is unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim is:

A bail handle holder adapted to be applied to a vessel consisting of a single piece of resilient sheet metal formed substantially U-shaped in side elevation and provided at the outer edge of the intermediate portion with a flange extending beyond the one side of the body of the piece and provided at a point between its ends with a notch, the end portions of the body of the piece being folded back upon themselves, said folded portions being ogee shaped in edge elevation and merging into extremities which are normally disposed substantially parallel with the inner part of the end portions of the body of the piece, said ogee shaped end portions and the extremities thereof being disposed at the opposite sides of the body of the piece from that side thereof beyond which the said flange is disposed.

In testimony whereof, I have affixed my signature in the presence of two witnesses.

ALLAN EDWARD BRYCE.

Witnesses:
JAMES B. WELCH,
WILLIAM F. WELCH.